(12) United States Patent  
Knowles et al.

(10) Patent No.: US 8,856,078 B2
(45) Date of Patent: Oct. 7, 2014

(54) DYNAMIC TIME REVERSAL OF A TREE OF IMAGES OF A VIRTUAL HARD DISK

(75) Inventors: Jonathan Knowles, Cambridge (GB); Vincent Robert Hanquez, Bar Hill (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 192 days.

(21) Appl. No.: 13/401,341

(22) Filed: Feb. 21, 2012

(65) Prior Publication Data

US 2013/0219135 A1    Aug. 22, 2013

(51) Int. Cl.
*G06F 12/00* (2006.01)

(52) U.S. Cl.
USPC .......................................... 707/649; 714/20

(58) Field of Classification Search
None
See application file for complete search history.

(56) References Cited

U.S. PATENT DOCUMENTS

| | | | |
|---|---|---|---|
| 7,197,665 B2* | 3/2007 | Goldstein et al. | 714/20 |
| 7,356,679 B1 | 4/2008 | Le et al. | |
| 7,680,996 B2 | 3/2010 | Komarov et al. | |
| 8,229,894 B2* | 7/2012 | Nonaka | 707/649 |
| 8,443,166 B2 | 5/2013 | Czezatke et al. | |
| 8,478,801 B2* | 7/2013 | Hutchins et al. | 707/829 |
| 8,538,919 B1 | 9/2013 | Nielsen et al. | |
| 2003/0193994 A1* | 10/2003 | Stickler | 375/150 |
| 2008/0033902 A1 | 2/2008 | Glaizel et al. | |
| 2008/0144950 A1* | 6/2008 | Amon et al. | 382/238 |
| 2009/0138869 A1* | 5/2009 | Fitzgerald et al. | 717/172 |
| 2009/0216816 A1 | 8/2009 | Basler et al. | |
| 2010/0058106 A1 | 3/2010 | Srinivasan et al. | |
| 2010/0082922 A1 | 4/2010 | George et al. | |
| 2011/0119240 A1* | 5/2011 | Shapira | 707/693 |

* cited by examiner

*Primary Examiner* — Charles Rones
*Assistant Examiner* — Tian-Pong Chang
(74) *Attorney, Agent, or Firm* — BainwodHuang

(57) ABSTRACT

A technique manages a virtual hard disk tree in a computing system executing a hypervisor to provide a client virtualization environment. The technique involves linking, by a client executing within a control virtual machine of the client virtualization environment, a first delta image of a virtual hard disk generated later in time to a base image of the virtual hard disk. The technique further involves modifying contents of the first delta image, the base image, and a second delta image which is linked to the base image; and deleting the second delta image after modifying the contents of the first delta image, the base image, and the second delta image. The base image and the first delta image, together with additional delta images of the virtual hard disk comprise a tree of images of the virtual hard disk.

23 Claims, 13 Drawing Sheets

DYNAMIC TIME REVERSAL OF A TREE OF IMAGES OF A VIRTUAL HARD DISK

BACKGROUND

Some client virtualization environments use chains of images to capture snapshots of virtual hard disks. One conventional image chain includes a base image (i.e., representing an entire physical disk drive) followed by forward delta images having sets of deltas (i.e., changed blocks and sectors) going forward in time. The base image resides at the tail of the chain and holds the oldest data, and the newest forward delta image resides at the head of the chain and holds the newest data.

To read a virtual sector from this conventional image chain, a program looks for the sector in the newest forward delta image at the head of the chain. If the sector resides in that forward delta image, the program retrieves the data from that forward delta image. However, if the sector does not reside in that forward delta image, the program then looks for the sector in the next forward delta image in the chain and so on until the program finds the sector. Ultimately, if the program reaches the tail of the chain without finding the sector in any of the forward delta images, the program looks for the sector in the base image at the tail of the chain. If the base image at the tail of the chain does not contain the sector, then the program assumes that the sector has never been written to, and the sector is therefore assumed to consist entirely of zeros.

There are deficiencies to the above-described conventional approach to using an image chain which includes a base image followed by forward delta images to capture snapshots of a virtual hard disk. For example, each operation to read current data incurs a time cost which linearly increases the farther that data is located from the head of the chain. Moreover, read performance further degrades as the image chain grows in length.

In contrast to the above-described conventional approach to capturing snapshots of a virtual hard disk (hereinafter referred to as the inefficient approach), a new approach to capturing snapshots of a virtual hard disk uses an image chain which includes a base image followed by backward delta images having sets of deltas going backward in time. In this new approach (hereinafter referred to as the more efficient approach), the base image resides near the head of the configuration and holds recent data, and an oldest backward delta image resides at the tail of the configuration and holds the oldest data.

To read a virtual sector from this image chain, a program looks for the sector in a delta image at the head of the chain. If the sector resides in that delta image, the program retrieves the data from that delta image. However, if the sector does not reside in that delta image, the program looks for the sector in the base image which immediately follows that delta image. Accordingly, the program is able to read current data quickly and inexpensively by accessing two images at most. That is, this more efficient approach optimizes the common case of reading current data (i.e., the newest data of the disk) over reading historical data (i.e., older data from a previous snapshot of the disk).

SUMMARY

To facilitate availability of the above-described more efficient approach to capturing snapshots of a virtual hard disk, a technique is provided which can transform a chain of images from a forward differencing formation (i.e., the inefficient approach) to a backward differencing formation (i.e., the more efficient approach) while maintaining the ability of running VMs to access current data as well as image snapshots during transformation. Such a technique may be performed with no meaningful increase in storage capacity. Furthermore, once transformation is complete so that the chain of images has the backward differencing formation, the current data is available for reading with low latency. Due to such low additional memory requirements during transformation and resulting improvements in reading efficiency, such a technique is well suited for use in a client virtualization environment having limited resources such as a desktop PC or a laptop PC which employs a Type 1 (or bare metal) hypervisor. Such a transformation technique is even capable of being applied to complex trees of images where multiple child images share the same parent image.

One embodiment is directed to a method of managing a virtual hard disk tree in a computing system executing a hypervisor to provide a client virtualization environment. The method includes linking, by a client executing within a control virtual machine of the client virtualization environment, a first delta image of a virtual hard disk generated later in time to a base image of the virtual hard disk. The method further includes modifying contents of the first delta image, the base image, and a second delta image which is linked to the base image; and deleting the second delta image after modifying the contents of the first delta image, the base image, and the second delta image. The base image and the first delta image, together with additional delta images of the virtual hard disk comprise a tree of images of the virtual hard disk.

In some arrangements, the method further includes providing a set of virtual machines (VMs) of the client virtualization environment with access to the contents of the first delta image, the base image, and the second delta image while modifying the contents of the first delta image, the base image, and the second delta image. Such operation enables transformation the tree of images from a forward differencing formation to a backward differencing formation to occur transparently in the background with respect to the set of VMs.

In some arrangements, modifying the contents of the first delta image, the base image, and the second delta image includes shifting deltas among the first delta image, the base image, and the second delta image.

In some arrangements, shifting deltas among the first delta image, the base image, and the second delta image includes moving, by the client, a first set of deltas from the base image into the first delta image and a corresponding set of deltas from the second delta image into the base image.

In some arrangements, moving, by the client, the first set of deltas from the base image into the first delta image and the corresponding set of deltas from the second delta image into the base image includes individually copying a delta from the base image to the first delta image and overwriting that delta in the base image with a corresponding delta from the second delta image until the first set of deltas is moved from the base image into the first delta image and the corresponding set of deltas is moved from the second delta image into the base image.

In some arrangements, the method further includes replacing a first snapshot pointer which points to the base image with a second snapshot pointer which points to the first delta image to maintain access to data of the base image.

In some arrangements, modifying contents of the first delta image, the base image, and the second delta image includes populating, after the first delta image is linked to the base image, the first delta image with deltas from the base image while providing a set of virtual machines with access to the tree of images.

In some arrangements, modifying contents of the first delta image, the base image, and the second delta image further includes populating the base image with deltas from the second delta image which is linked to the base image.

In some arrangements, populating the first delta image with deltas from the base image includes, for each delta of the second delta image, copying a corresponding block from the base image to the first delta image, the blocks copied from the base image to the first delta image containing data which is older than that of the deltas of the second delta image.

In some arrangements, populating the base image with deltas from the second delta image includes, for each delta of the second delta image, replacing a corresponding block of the base image with that delta, the blocks being replaced containing data which is older than that of the deltas from the second delta image.

In some arrangements, the method further includes discontinuing, after populating the base image with the deltas from the second delta image, access to the second delta image while continuing to provide the set of virtual machines with access to the tree of images, and subsequently removing the second delta image from the tree of images.

In some arrangements, discontinuing access to the second delta image while continuing to provide the set of virtual machines with access to the tree of images includes (i) replacing a third snapshot pointer which points to the second delta image with a fourth snapshot pointer which points to the base image to maintain access to data of the second delta image, and (ii) circumventing the second delta image by creating a link from another delta image to the base image.

In some arrangements, the method further comprises traversing at least a portion of the tree of images in a forward-in-time direction to read data on behalf of a first virtual machine of the client virtualization environment and traversing at least a portion of the tree of images in a backward-in-time direction to read data on behalf of a second virtual machine of the client virtualization environment.

In some arrangements, the tree of images includes multiple sub-chains of images which branch from a common image. In these arrangements, the method further comprises traversing at least a portion of a first sub-chain of the tree of images to read data on behalf of a first virtual machine of the client virtualization environment and traversing at least a portion of a second sub-chain of the tree of images to read data on behalf of a second virtual machine of the client virtualization environment.

Another embodiment is directed to a computing system for managing a virtual hard disk tree. The computing system includes physical memory which stores a hypervisor and a control program, and a physical processor coupled to the physical memory, the physical processor executing the hypervisor to provide a client virtualization environment. The control program, when executing within a control virtual machine of the client virtualization environment, is constructed and arranged to: link a first delta image of a virtual hard disk generated later in time to a base image of the virtual hard disk, modify contents of the first delta image, the base image, and a second delta image which is linked to the base image, and delete the second delta image after modifying the contents of the first delta image, the base image, and the second delta image. The base image and the first delta image, together with additional delta images of the virtual hard disk comprise a tree of images of the virtual hard disk.

In some arrangements, a set of virtual machines of the client virtualization environment is constructed and arranged to access the contents of the first delta image, the base image, and the second delta image while the control program modifies the contents of the first delta image, the base image, and the second delta image.

In some arrangements, the control program is further constructed and arranged to replace a first snapshot pointer which points to the base image with a second snapshot pointer which points to the first delta image to maintain access to data of the base image.

In some arrangements, the control program, when modifying contents of the first delta image, the base image, and the second delta image, is constructed and arranged to individually copy a delta from the base image to the first delta image and overwriting that delta in the base image with a corresponding delta from the second delta image until a first set of deltas is moved from the base image into the first delta image and a corresponding set of deltas is moved from the second delta image into the base image.

In some arrangements, at least a portion of the tree of images is traversed in a forward-in-time direction to read data on behalf of a first virtual machine of the client virtualization environment and at least a portion of the tree of images is traversed in a backward-in-time direction to read data on behalf of a second virtual machine of the client virtualization environment.

In some arrangements, the tree of images includes multiple sub-chains of images which branch from a common image.

Other embodiments are directed to computing devices, computing platforms, computer program products, and so on. Some embodiments are directed to various processes, electronic components and circuits which are involved in operating a virtualization environment which hosts a set of VMs during transformation of a VHD configuration.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Techniques are provided which involve transforming configurations of virtual hard disk (VHD) images from forward differencing formations to backward differencing formations. Such techniques may be performed with no meaningful increase in storage capacity and maintain the ability of running virtual machines (VMs) to access current data as well as image snapshots during transformation. Furthermore, once transformation is complete so that a configuration of images has the backward differencing formation, the current data is available for reading efficiently and with low latency. Accordingly, such techniques are well suited for use in a client virtualization environment having limited processor and memory resources such as a desktop PC or a laptop PC.

Figure 1:
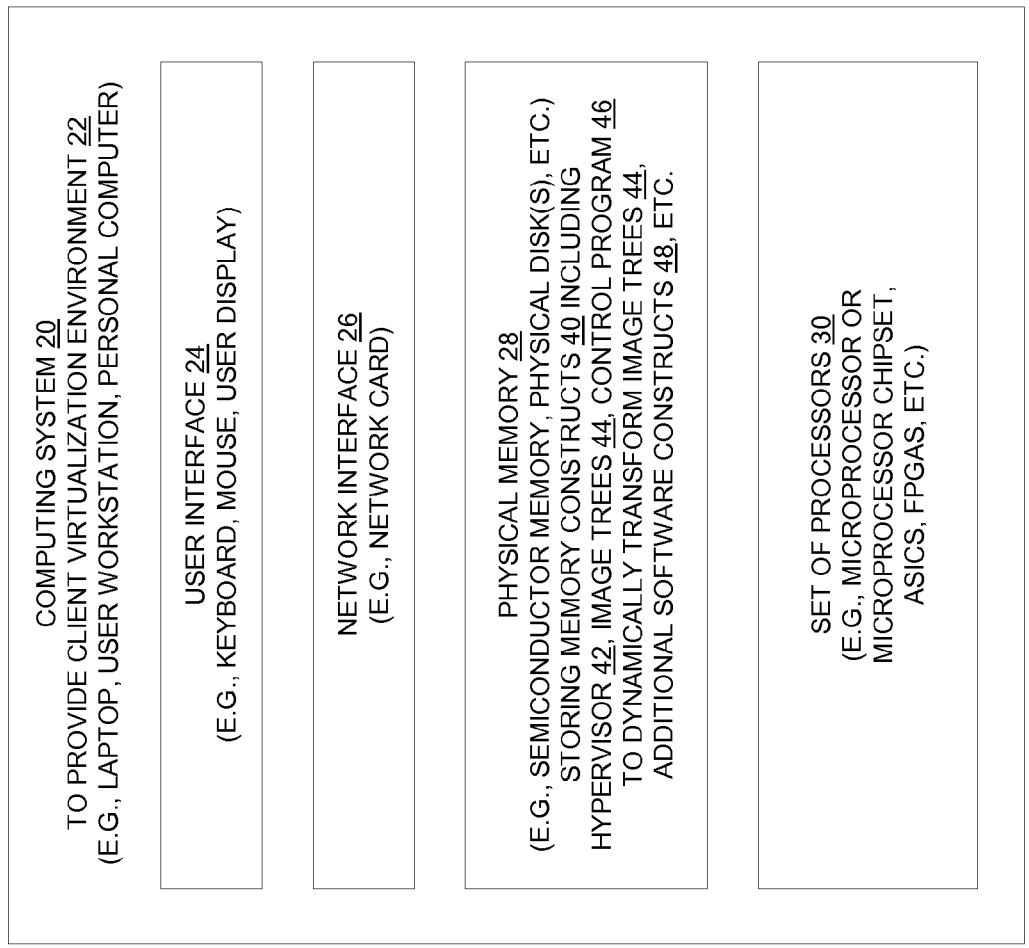
FIG. 1 is a block diagram of a computing system which transforms a configuration of images from a forward differencing formation to a backward differencing formation while concurrently providing a set of virtual machines with access to the configuration of images.

FIG. 1 shows a computing system 20 which provides a client virtualization environment 22 and transforms a tree of images of a virtual hard disk from a forward differencing formation to a backward differencing formation while concurrently providing a set of VMs with continued access to the tree of images. As shown in FIG. 1, the computing system 20 includes a user interface 24, a network interface 26, physical memory 28, and a set of processors 30.

The user interface 24 is constructed and arranged to receive input from a user, and to provide output to the user. In the context of an apparatus having a client virtualization architecture such as a desktop PC or a laptop PC, the user interface 24 may include a keyboard, a pointing device (e.g., a mouse, a touchpad, etc.), and an electronic display.

The network interface 26 is constructed and arranged to connect to a communications medium and thus enable the computing system 20 to exchange electronic communications with other systems. In the context of a client apparatus, the network interface 26 may include a network interface card (NIC) to connect to a computer network.

The physical memory 28 is constructed and arranged to store a variety of memory constructs 40 including a hypervisor 42, image trees 44, a control program 46 to dynamically transform image trees 44 from a forward differencing formation to a backward differencing formation, and additional software constructs 48 (guest operating systems, utilities, administrative and control applications, etc.). The physical memory 28 refers to volatile storage (e.g., fast non-persistent semiconductor memory) as well as non-volatile storage (e.g., physical magnetic disks, flash memory, etc.).

The set of processors 30 is constructed and arranged to access the software constructs 40 from the physical memory 28 and perform useful work. In particular, during operation, the set of processors 30 provides the client virtualization environment 22. While VMs of the client virtualization environment 22 access data within an image tree 44, the control program 46 is capable of transparently transforming that image tree 44 from a forward differencing formation to a backward differencing formation with no meaningful increase in storage. Further details will now be provided with reference to FIG. 2.

Figure 2:
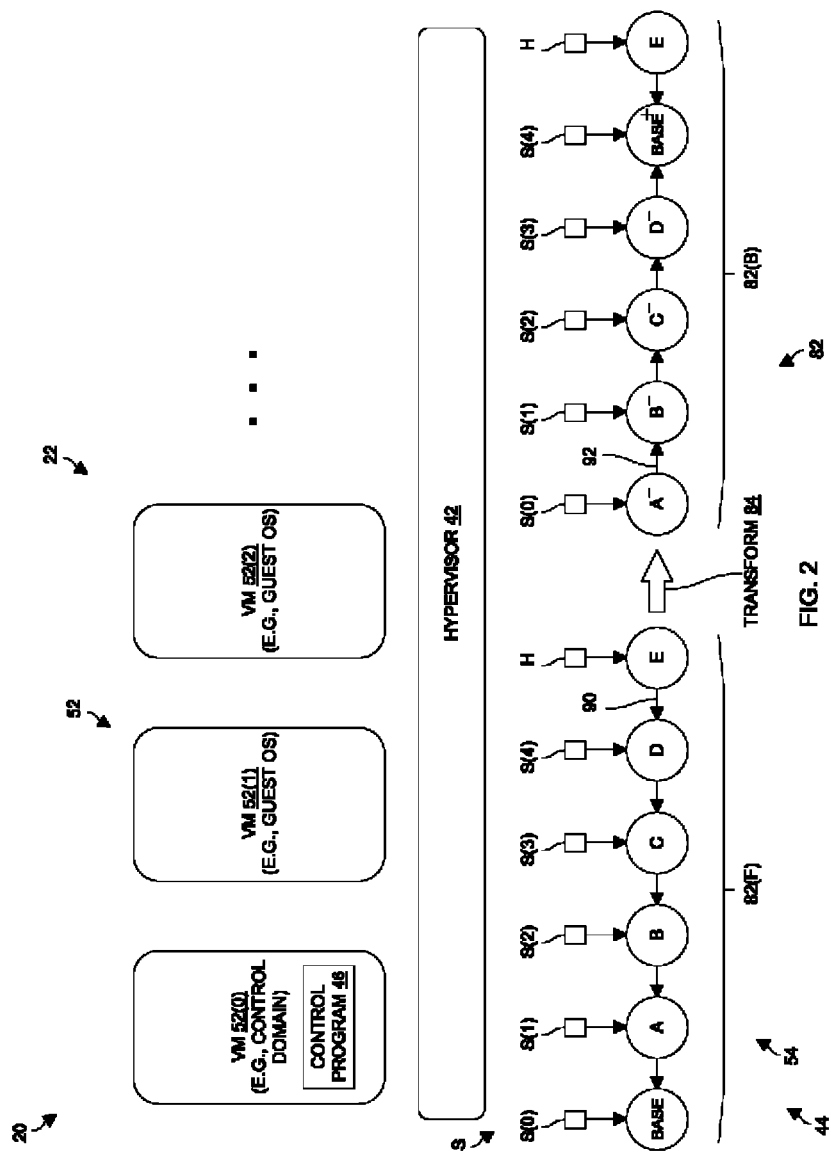
FIG. 2 is a logical block diagram of particular components of the computing system of FIG. 1 during operation.

FIG. 2 shows a logical representation of various components of the virtualization environment 22 of the computing system 20 (also see FIG. 1). As shown in FIG. 2, the virtualization environment 22 includes VMs 52(0), 52(1), 52(2), . . . and a hypervisor 42. By way of example, the VM 52(0) is a control VM of the client virtualization environment 22. The other VMs 52 may run guest operating systems and perform useful work on behalf of the user of the computing system 20.

Each image tree 44 is a configuration of multiple VHD images 54. By way of example and for simplicity, each image tree 44 in FIG. 2 is a chain of images 54 (i.e., a tree 44 without any branches). In particular, each chain of images 54 includes a base image (labeled "BASE") which represents a full disk, and delta images (labeled with a capital letter) which store only changed blocks, i.e., deltas. As will now be explained, the images 54 of each chain may be arranged in a variety of formations 82.

In particular, an image chain may reside in a forward differencing formation 82(F) in which the base image 54 resides at the tail of that chain and holds the oldest data, and a newest forward differencing image 54 resides at the head of that chain and holds the newest data. The left lower corner of FIG. 2 shows an example chain while in the forward differencing formation 82(F). Here, a base image 54 (labeled "BASE") is at the tail of the chain, and forward differencing images 54 (labeled "A", "B", "C", "D", and "E") having deltas going forward in time extend from the base image 54 toward the head of the chain. The base image 54 (labeled "BASE"), which holds the oldest data, can be accessed through a snapshot pointer S(0). The adjacent forward differencing image 54 (labeled "A"), which holds one or more deltas of newer data, can be accessed through a snapshot pointer S(1), and so on.

To read a sector from the forward differencing formation 82(F), the hypervisor 42 first looks for the sector in the differencing image labeled "E" via the head pointer H. If the sector resides in that differencing image, the hypervisor 42 retrieves the data from that differencing image. However, if the data does not reside in that differencing image, the hypervisor 42 then looks for the sector in the next forward differencing image in the chain (as illustrated by the left pointing link 90) and so on until the hypervisor 42 finds the sector. Ultimately, if the hypervisor 42 reaches the tail of the chain without finding the sector in any of the forward differencing images, the hypervisor 42 looks for the sector within the base image (labeled "BASE") at the tail of the chain. If the sector is not present within the base image at the tail of the chain, it is assumed that the sector has never been written and is therefore equivalent to a string of zero bytes. Unfortunately, with this legacy approach, each operation to read data incurs a time cost which linearly increases the farther the data is located from the head of the chain. Furthermore, read performance further degrades as the chain of images 54 grows in length.

Advantageously, a chain of images 54 within the computing system 20 may reside in a backward differencing formation 82(B) in which a base image 54 resides near a head of that chain and holds recent data, and an oldest backward differencing image 54 resides at the tail of that chain and holds the oldest data. The right lower corner of FIG. 2 shows the example chain of images 54 while in the backward differencing formation 82(B). Here, the base image 54 (labeled "BASE+") is adjacent the head of the chain and can be accessed through a snapshot pointer S(4), and forward differencing images 54 (labeled "D−", "C−", "B−", and "A−") having deltas going backward in time extend from the base image 54 toward the tail of the chain. The differencing image labeled "D−", which holds older data, can be accessed through a snapshot pointer S(3), and so on. Ultimately, the differencing image labeled "A−", which holds the oldest data, can be accessed through a snapshot pointer S(0).

To read a sector from the backward differencing formation 82(B), the hypervisor 42 first looks for the sector in a differencing image labeled "E" at the head of the chain. This differencing image holds the newest data in the chain. If the sector resides in that image 54, the hypervisor 42 retrieves the data from that differencing image 54. However, if the sector does not reside in that differencing image 54, the hypervisor 42 looks for the sector in the base image 54 (labeled "BASE+") which immediately follows that differencing image 54. If the sector is not present in the base image 54, it is assumed that the sector has never been written and is therefore a string of zero bytes. Accordingly, the hypervisor 42 is able to read current data quickly and inexpensively by accessing these two images 54 at most. That is, this new approach optimizes the common case of reading current data over reading historical data. Moreover, the hypervisor 42 is able to read historical data through any of the snapshot pointers S and, if necessary, one or more next backward differencing images 54 via the right pointing links 92.

At this point, it should be understood that the computing system 20 is equipped with a control program 46 (see VM 52(0) in FIG. 2) which conveniently performs a transformation procedure 84 (illustrated by the large arrow labeled 84 between the formations 82(F) and 82(B) in FIG. 2) to convert a chain of images 54 from the forward differencing formation 82(F) to the backward differencing formation 82(B). The control program 46 may operate transparently in the background (e.g., during idle time) while the VMs 52 continue to run and access the images 54. Nevertheless, the integrity of all of the data (i.e., current and historical data) is preserved before, during, and after the transformation process 84.

Based on the description above, it should be understood that the VMs 52 have continued access to the data at all times. In particular, the head of the chain can be kept mounted in read-write mode by a VM 52. Additionally, any (or all) of the historical snapshot points within the chain can be kept mounted by a VM 52 (or multiple VMs 52) in read-only mode to read historical data. Moreover, from the point of view of any VM 52, multiple reads from the same virtual address of any given snapshot point provide the same result. Further details will now be provided with reference to FIGS. 3 through 10.

FIGS. 3 through 10 illustrate details of the transformation process 84 when transforming the example chain of images 54 of FIG. 2 from the forward differencing formation 82(F) to the backward differencing formation 82(B). To begin, suppose that the computing system 20 previously stored data in chains of images 54 using a legacy approach for some amount of time thus creating the example chain having the forward differencing formation 82(F) (also see FIG. 2). However, further suppose that a decision has now been made to run the control program 46 to transform the example chain from the forward differencing formation 82(F) to the backward differencing formation 82(B) and subsequently maintain the example chain in the backward differencing formation 82(B).

Figure 3:
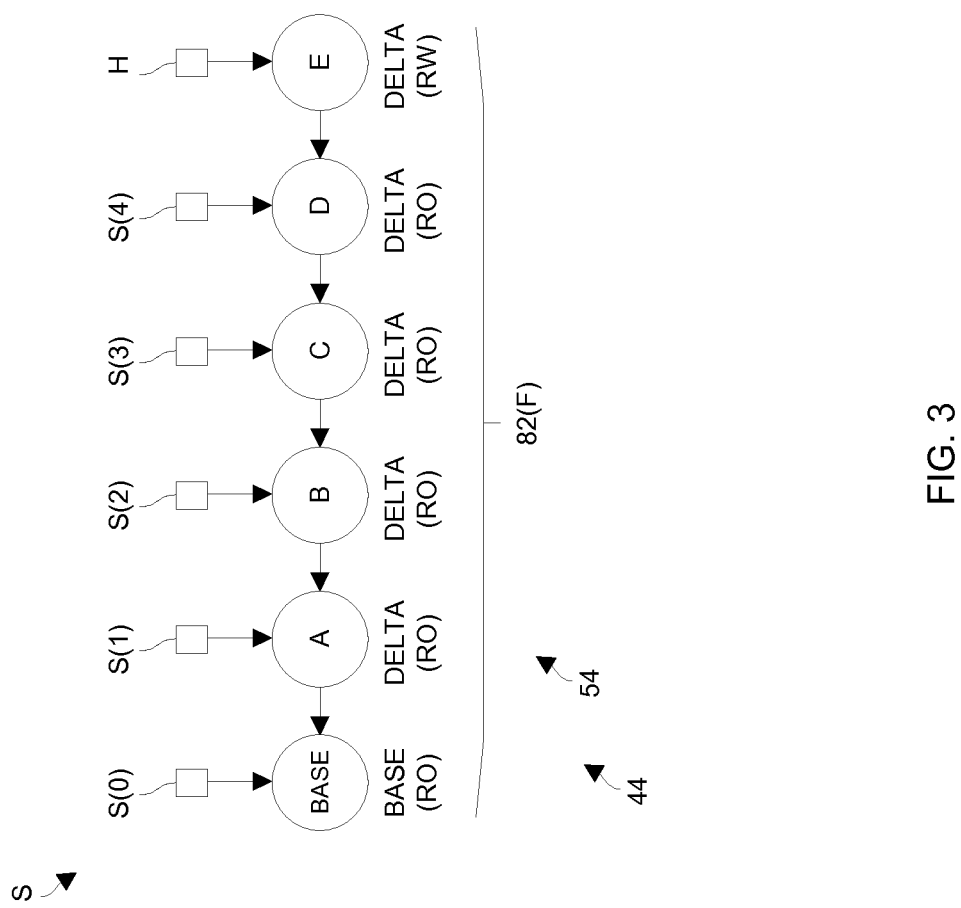
FIG. 3 is an initial state of an example configuration of images prior to transformation.

FIG. 3 shows the example chain of images 54 having the forward differencing formation 82(F) prior to beginning the transformation process 84. Each image 54 is labeled to indicate whether it is a differencing image 54 (labeled "DELTA") or a base image 54 (labeled "BASE"). Furthermore, each image 54 is labeled whether it is read only (labeled "RO") or read/write enabled (labeled "RW").

As shown in FIG. 3, new data can be written to the example chain through the head pointer H which references a forward differencing image labeled "E". Likewise, current data (for a given sector) from the example chain can be read starting with the forward differencing image labeled "E" via the head pointer H. If the sector resides in that image 54, the data for that sector is retrieved from that image 54. However, if the sector does not reside in that image 54, the next forward differencing image labeled "D" (which is read only) in the example chain is accessed and so on until the sector is found, or until all the links in the chain have been traversed. If the sector could not be found, then it is assumed that the sector has never been written and is therefore equivalent to a string of zero bytes. In a similar manner, historical data from a snapshot can be obtained through a corresponding snapshot pointer S.

Figure 4:
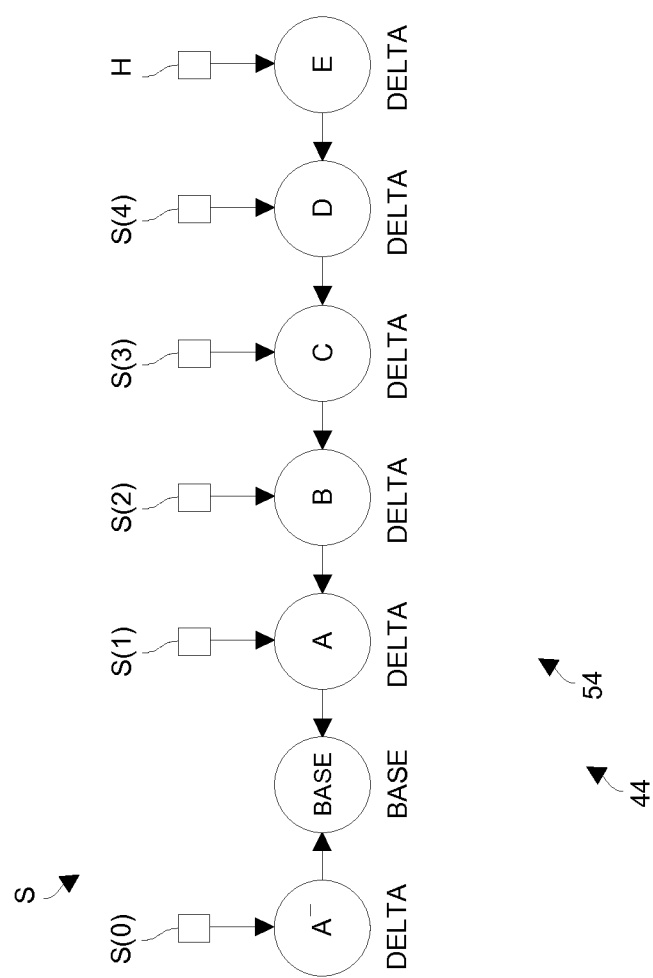
FIG. 4 is an intermediate state of the example configuration of images during transformation.

Now suppose that a user has invoked the control program 46 (FIGS. 1 and 2) to transform the example chain from the forward differencing formation 82(F) to the backward differencing formation 82(B). As shown in FIG. 4, the control program 46 responds by manipulating the chain in a manner which preserves data integrity as well as preserves the ability for the VMs 52 (FIG. 2) to continue reading from and writing to the chain. In particular, the control program 46 links a new differencing image labeled "A−", which is initially empty, to the chain and then adjusts the snapshot pointer S(0) to point to the new differencing image labeled "A−" rather than the base image labeled "BASE". At this point, historical data of the base image is still accessible via the snapshot pointer S(0) although now the new differencing image labeled "A−" (which is currently empty) is checked for the data prior to accessing the base image. All other snapshot pointers S and the head pointer H still provide access to images 54 as before.

Next, for each delta in the differencing image labeled "A", the control program 46 copies a corresponding block from the base image labeled "BASE" to the new differencing image labeled "A−". For example, for a delta corresponding to block #16 in the base image, the control program 46 copies block #16 from the base image into the new image labeled "A−" as a backward delta, and so on. Accordingly, historical data of the base image is still accessible via the snapshot pointer S(0) although now the new differencing image labeled "A−" (which now contains blocks from the base image) is checked for the data prior to accessing the base image. Again, all other snapshot pointers S and the head pointer H still provide access to data as before.

As each block is copied from the base image labeled "BASE" to the new differencing image labeled "A−", the control program 46 moves each corresponding delta in the differencing image labeled "A" into the base image labeled "BASE". In particular, for each delta in the differencing image labeled "A", the control program 46 (i) backs up the corresponding block of the base image labeled "BASE" by copying the block into the differencing image labeled "A−", (ii) overwrites the corresponding block of the base image labeled "BASE" with that delta to populate the base image with data from the differencing image labeled "A", and then (iii) deletes that delta from the differencing image labeled "A". For example, for the delta in the differencing image labeled "A" corresponding to block #16 in the base image, the control program 46 (i) backs up the contents of block #16 in the base image by copying the block into the differencing image labeled "A−", (ii) overwrites block #16 in the base image with that delta and then (iii) deletes that delta from the differencing image labeled "A". It should be understood that the overwritten blocks are not lost since the control program 46 had previously copied these blocks to the new differencing image labeled "A−". Furthermore, the forward deltas of the differencing image labeled "A" are not lost since these deltas now reside in the base image labeled "BASE".

At this point, one should appreciate that the transformation process 84 is performed block by block across each of the three images labeled "A–", "BASE" and "A". Accordingly, the backward differencing image labeled "A–" is growing at the same time the forward differencing image labeled "A" is shrinking. As a result, the additional storage needed during this reversal process does not require a meaningful increase in storage capacity.

Figure 5:
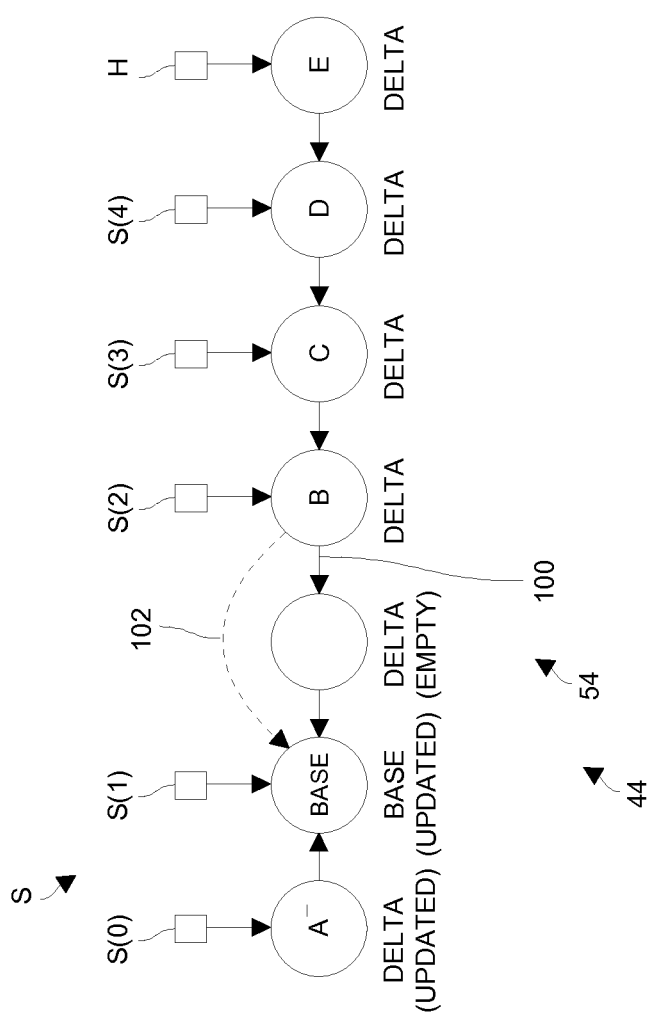
FIG. 5 is an intermediate state of the example configuration of images following that of FIG. 4.

Once the differencing image labeled "A" is empty (i.e., all of the deltas have been transferred to the base image labeled "BASE"), the control program 46 adjusts the snapshot pointer S(1) to point to the base image labeled "BASE" rather than the differencing image labeled "A". At this point and as shown in FIG. 5, historical data of the differencing image labeled "A" is still accessible via the snapshot pointer S(1) although now the base image labeled "BASE" holds the data. All other snapshot pointers S and the head pointer H still provide access to data as before.

At this point, the control program 46 replaces the link 100 which links the differencing image labeled "B" to the differencing image labeled "A" (also see the left pointing links 90 in FIG. 2) with a new link 102 which links the differencing image labeled "B" to the base image labeled "BASE". This link adjustment process is illustrated by the dashed arrow 102 in FIG. 5.

Figure 6:
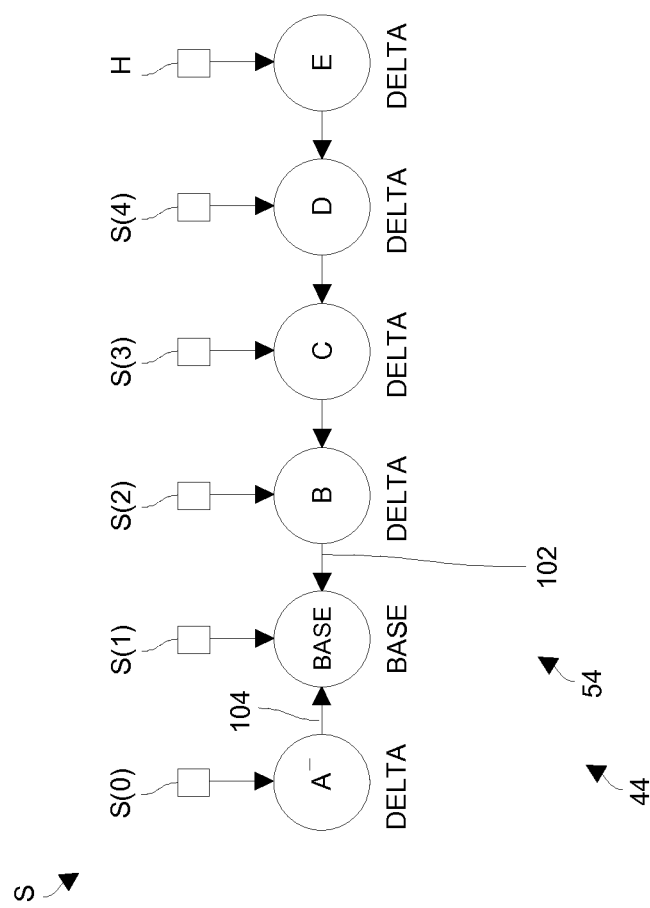
FIG. 6 is an intermediate state of the example configuration of images following that of FIG. 5.

Finally, with the new link 102 in place, the control program 46 deletes the empty differencing image 54 from the chain as illustrated in FIG. 6. The chain is now partially transformed. In particular, there is one fewer left-pointing link 102 and an additional right-pointing link 104.

Figure 7:
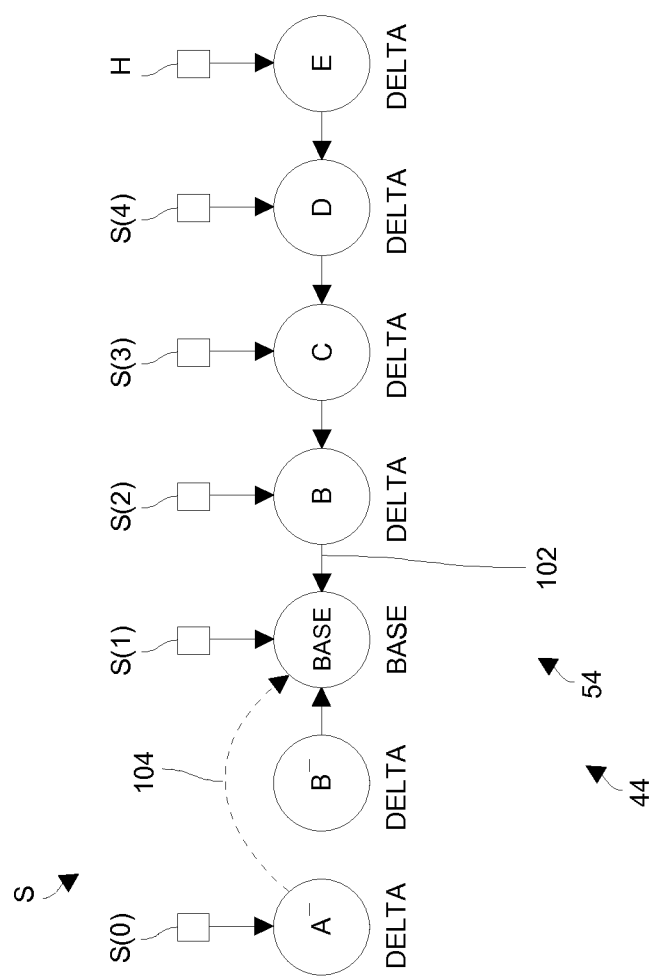
FIG. 7 is an intermediate state of the example configuration of images following that of FIG. 6.

As shown in FIG. 7, the control program 46 continues the transformation process 84 (FIG. 2) by linking a new differencing image labeled "B–", which is initially empty, to the chain. In particular, the new differencing image labeled "B–" links directly to the base image labeled "BASE". As also shown in FIG. 7, the earlier-added differencing image labeled "A–" links directly to the base image labeled "BASE" as well (see the dashed arrow 104 in FIG. 7).

Figure 8:
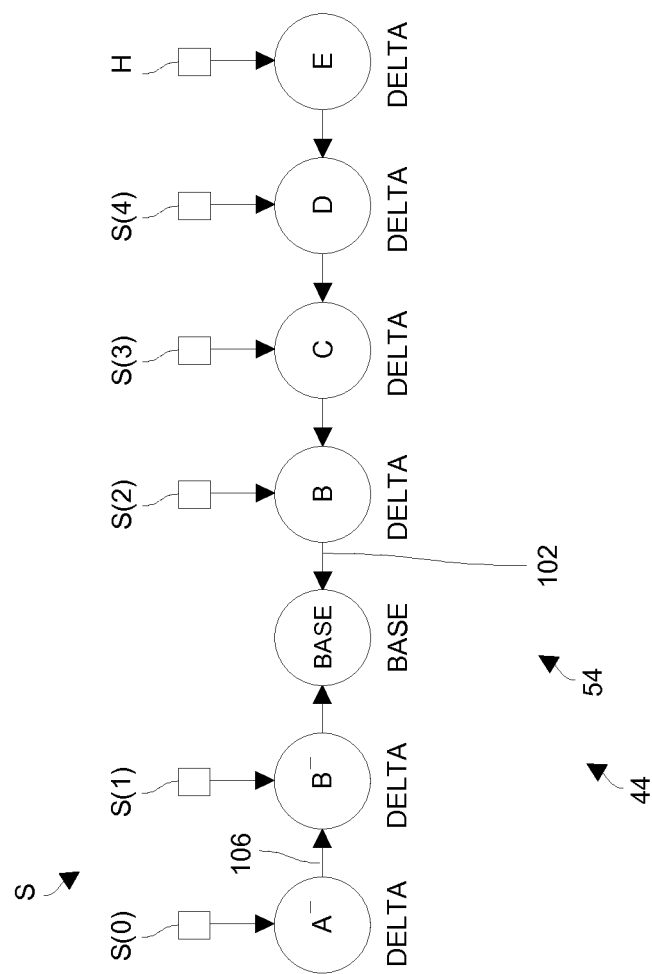
FIG. 8 is an intermediate state of the example configuration of images following that of FIG. 7.

As shown in FIG. 8, the control program 46 then replaces the link 104 (shown by the dashed arrow 104 in FIG. 7) with a new link 106 (FIG. 8) so that the new differencing image labeled "B–" is now interconnected between the differencing image labeled "A–" and the base image labeled "BASE". Subsequently, the control program 46 adjusts the snapshot pointer S(1) to point to the new differencing image labeled "B–" rather than the base image labeled "BASE". At this point, historical data of the base image 54 is still accessible via the snapshot pointer S(1) although now the new differencing image labeled "B–" (which is currently empty) is checked for the data prior to accessing the base image 54. Similarly, historical data of the differencing image labeled "A–" is still accessible via the snapshot pointer S(0) although, again, the new differencing image labeled "B–" is checked for the data prior to accessing the base image 54. All other snapshot pointers S and the head pointer H still provide access to data as before.

In a manner similar to that described above in connection with FIG. 4, for each delta in the differencing image labeled "B", the control program 46 copies a corresponding block from the base image labeled "BASE" to the new differencing image labeled "B–". Accordingly, historical data of the base image 54 is still accessible via the snapshot pointers S(0) and S(1) although now the new differencing image labeled "B–" (which now contains changed blocks) is checked for the data prior to accessing the base image 54. Again, all other snapshot pointers S and the head pointer H still provide access to data as before.

Subsequently, the control program 46 moves each delta in the differencing image labeled "B" to the base image labeled "BASE". In particular, for each forward delta in the differencing image labeled "B", the control program 46 (i) backs up the corresponding block of the base image labeled "BASE" by copying the block into the differencing image labeled "B–", (ii) overwrites the corresponding block of the base image labeled "BASE" with that delta and then (iii) deletes that delta from the differencing image labeled "B". It should be understood that the overwritten blocks are not lost since the control program 46 had previously copied these blocks to the new differencing image labeled "B–". Furthermore, the deltas of the differencing image labeled "B" are not lost since these deltas now reside in the base image labeled "BASE".

Figure 9:
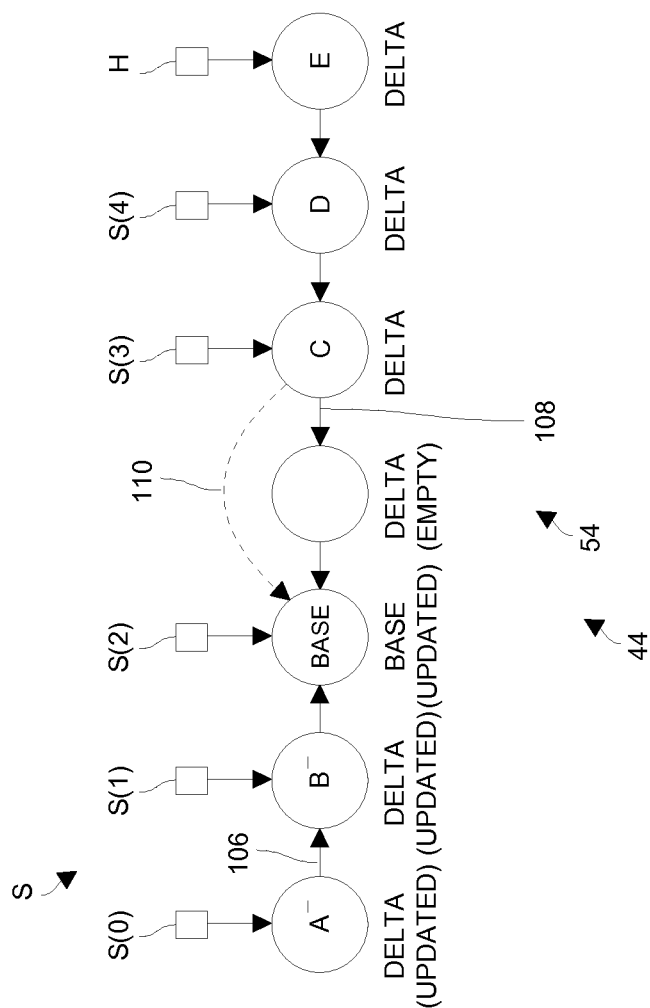
FIG. 9 is an intermediate state of the example configuration of images following that of FIG. 8.

Once the differencing image labeled "B" is empty (i.e., all of the deltas have been transferred to the base image labeled "BASE"), the control program 46 adjusts the snapshot pointer S(2) to point to the base image labeled "BASE" rather than the differencing image labeled "B" as shown in FIG. 9. At this point, historical data of the differencing image labeled "B" is still accessible via the snapshot pointer S(2) although now the base image labeled "BASE" holds the data.

Next, the control program 46 replaces the link 108 (FIG. 9) which linked the differencing image labeled "C" to the differencing image labeled "B" (also see the left pointing links 90 in FIG. 2) with a new link 110 which links the differencing image labeled "C" directly to the base image labeled "BASE". This link adjustment process is illustrated by the dashed arrow 110 in FIG. 9.

Figure 10:
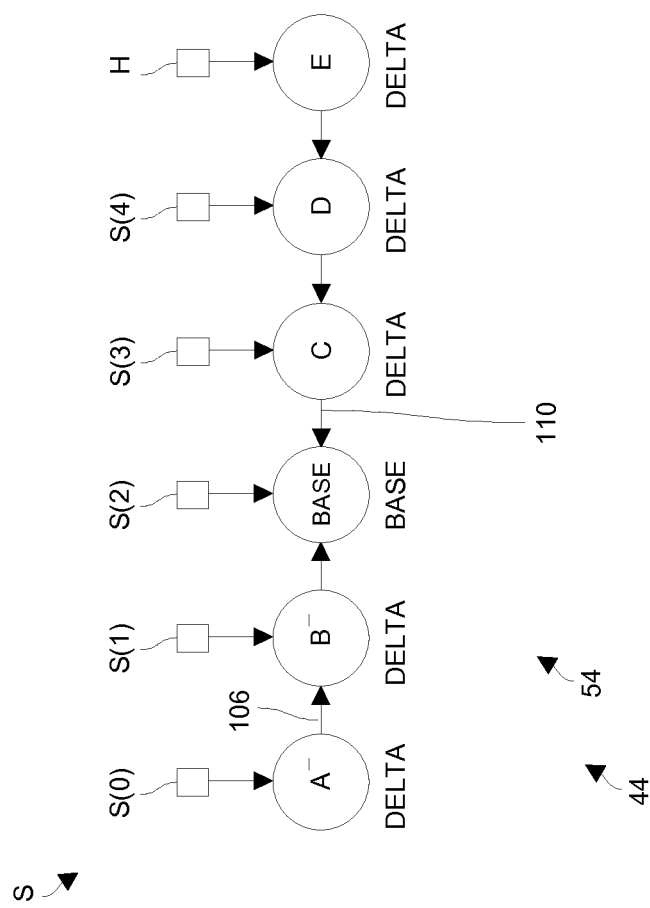
FIG. 10 is an intermediate state of the example configuration of images following that of FIG. 9.

Finally, with the new link 110 in place, the control program 46 deletes the empty differencing image 54 from the chain as illustrated in FIG. 10. The chain is now further transformed. In particular, there are fewer left pointing links 110 (also see links 90 in FIG. 2) thus improving read performance through the pointers S and H on the right side of the chain.

It should be understood that the control program 46 continues to convert the chain in the manner described above until the chain has the backward differencing formation 82(B) as shown in FIG. 2. During this transformation process 84, the VMs 52 did not need to stop running or disconnect the images 54. Rather, at most, the reading or writing operation is briefly paused while the control program 46 adjusts certain metadata such as the snapshot pointers S and the links (e.g., a small operation that takes only a few microseconds).

It should be further understood that there is no need to significantly increase memory consumption during or after transformation. Rather, the amount of additional storage consumed during transformation may be minimal (e.g., limited to caching a few blocks, etc.).

It should be further understood the transformation process 84 is capable of being stopped indefinitely during the middle of the process 84. For example, if the computing system 20 needed to restart or if the transformation process 84 needed to be halted for an extended period, the integrity of the data (current data and historical data) is preserved while the chain remains partially transformed. Once the chain is put in the backward differencing formation 82(B), there is no longer any need to read through a long series of images 54 in order to retrieve current data (the common case). Further details will now be provided with reference to FIGS. 11 and 12.

Figure 11:
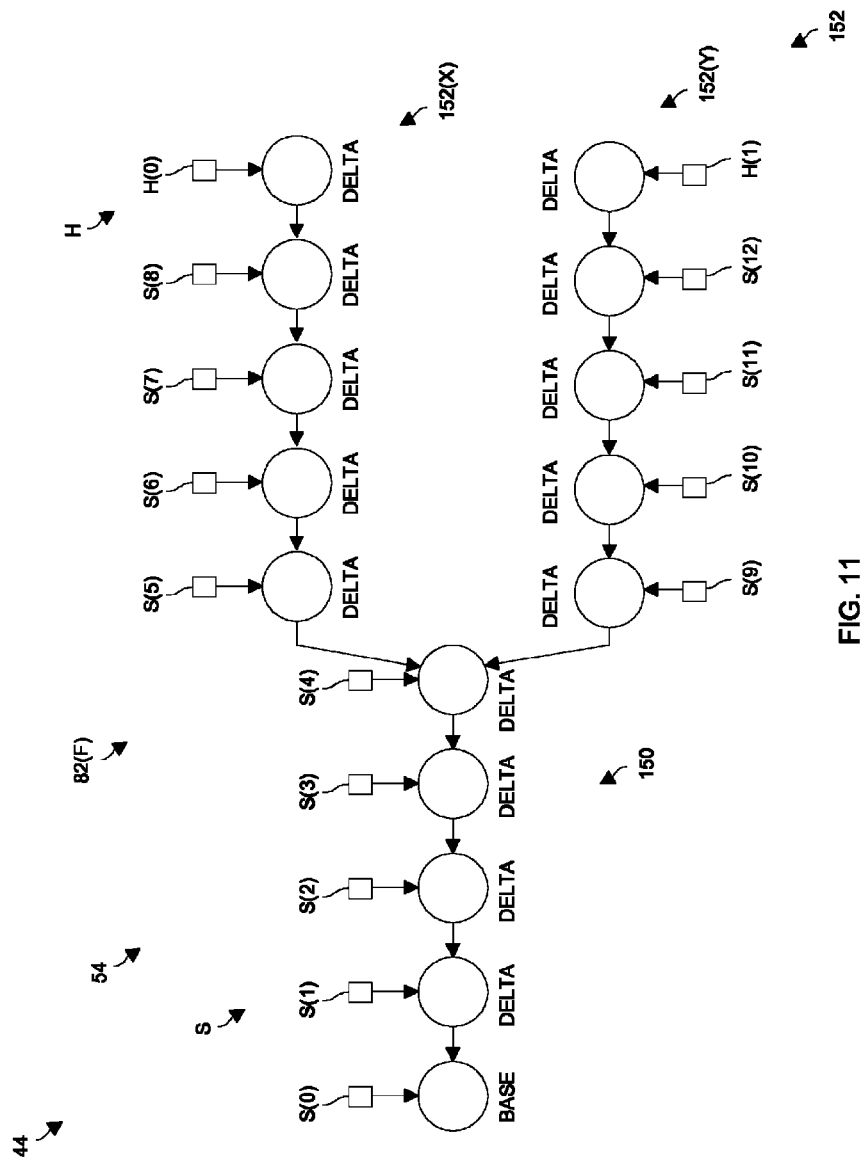
FIG. 11 is an initial state of another example configuration of images prior to transformation.
Figure 12:
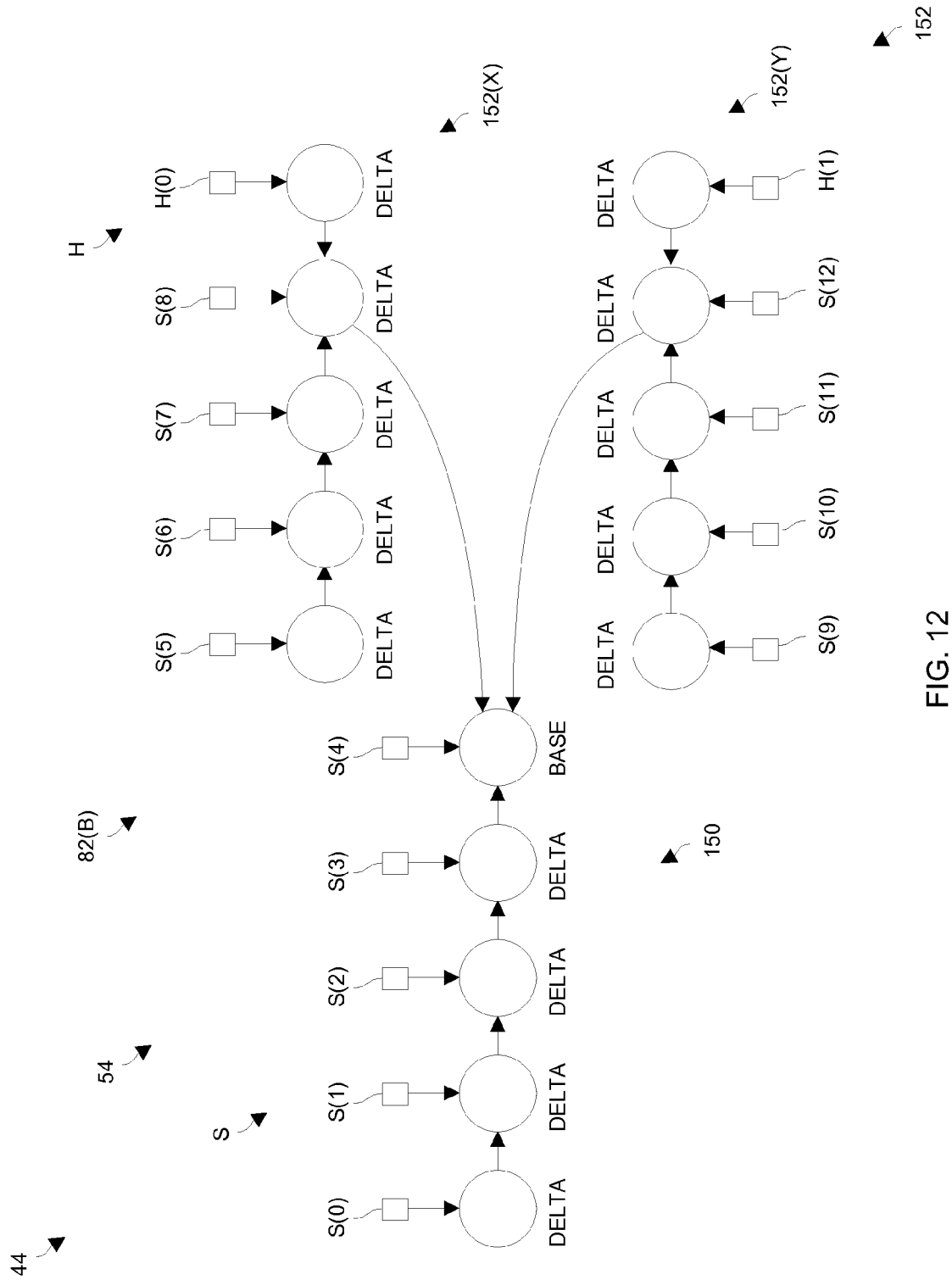
FIG. 12 is a finished state of the other example configuration of images of FIG. 11 following transformation.

FIGS. 11 and 12 show details of a complex tree 44 of images 54 (i.e., a tree 44 having multiple branches). FIG. 11 shows the tree 44 when in a forward differencing formation 82(F) (e.g., prior to applying the reversal process). FIG. 12 shows the tree 44 when in a backward differencing formation 82(B) (e.g., after applying the reversal process).

As shown in FIG. 11, the forward differencing formation 82(F) of the tree 44 includes a common chain 150 of images 54, and separate sub-chain portions 152(X), 152(Y) (collectively, sub-chains 152). A base image 54 (labeled "BASE") resides at a tail of the tree 44 and stores the oldest data. The other images 54 (labeled "DELTA") are differencing images and store newer data as deltas going forward in time.

One set of current data of the tree 44 is accessed via head pointer H(0) which extends through left pointing links along sub-chain 152(X) and the common portion 150. Similarly, another set of current data of the tree 44 is accessed via head pointer H(1) which extends through left pointing links along sub-chain 152(Y) and the common portion 150. Furthermore, historical data from the tree 44 is accessed via the snapshot pointers S.

During transformation from the forward differencing formation 82(F) to the backward differencing formation 82(B), the control program 46 (FIGS. 1 and 2) systematically transforms the various part of the tree 44 while maintaining data integrity and allowing running VMs 52 to access data from the tree 44. In particular, the control program 46 first converts the common portion 150 of the tree 44 in a manner similar to that described above in connection with the example chain of FIGS. 3 through 10. Along these lines, the control program 46 starts at the base image 54, or root of the tree, and works toward the differencing image 54 which forks into branches of the tree 44.

After the common portion 150 is transformed, the control program 46 separately transforms each sub-chain 152 until the tree 44 is completely transformed to the backward differencing formation 82(B). In particular, for each sub-chain 152, the control program 46 starts at the end which is linked to the common portion 150 and works in the direction toward the far end, i.e., a leaf of the tree 44.

As shown in FIG. 12, the common portion 150 now includes differencing images 54 having sets of deltas going backward in time. Additionally, the image 54 which is referenced by snapshot pointer S(4) is now a base image and is thus labeled "BASE". Each sub-chain 152 includes differencing images 54 having sets of deltas which also go backward in time.

It should be understood that the differencing image 54 which is accessed via the snapshot pointer S(8) includes deltas (i.e., changed blocks) from the differencing images 54 referenced by snapshot pointers S(5) through S(7). Similarly, the differencing image 54 which is accessed via the snapshot pointer S(12) includes deltas from the differencing image 54 referenced by snapshot pointers S(9) through S(11). Accordingly, the differencing images 54 which are accessed via the snapshot pointers S(8) and S(12) may be referred to as cumulative differencing disks, i.e., images 54 containing deltas possibly from multiple forward differencing images 54. Nevertheless, there is only one base image 54 (referenced by snapshot pointer S(4)), and the tree 44 when in the backward differencing formation 82(B) (FIG. 12) consumes substantially the same amount of storage as the tree 44 did when in the forward differencing formation 82(F).

It should be understood that, even while transformation of the complete tree 44 of images 54 is happening, the VMs 52 have the ability to access current and historical data from the tree 44. In particular, the head of sub-chain 152(X) is accessed via head pointer H(0), the head of sub-chain 152(Y) is accessed via head pointer H(1), and the other historical snapshots are accessed via respective snapshot pointers S.

It should be further understood that the transformation process 84 may be suspended while in process, but data access is still available. This suspension period may be for an extended period of time or even indefinitely, but the data is still accessible. Further details will now be provided with reference to FIG. 13.

Figure 13:
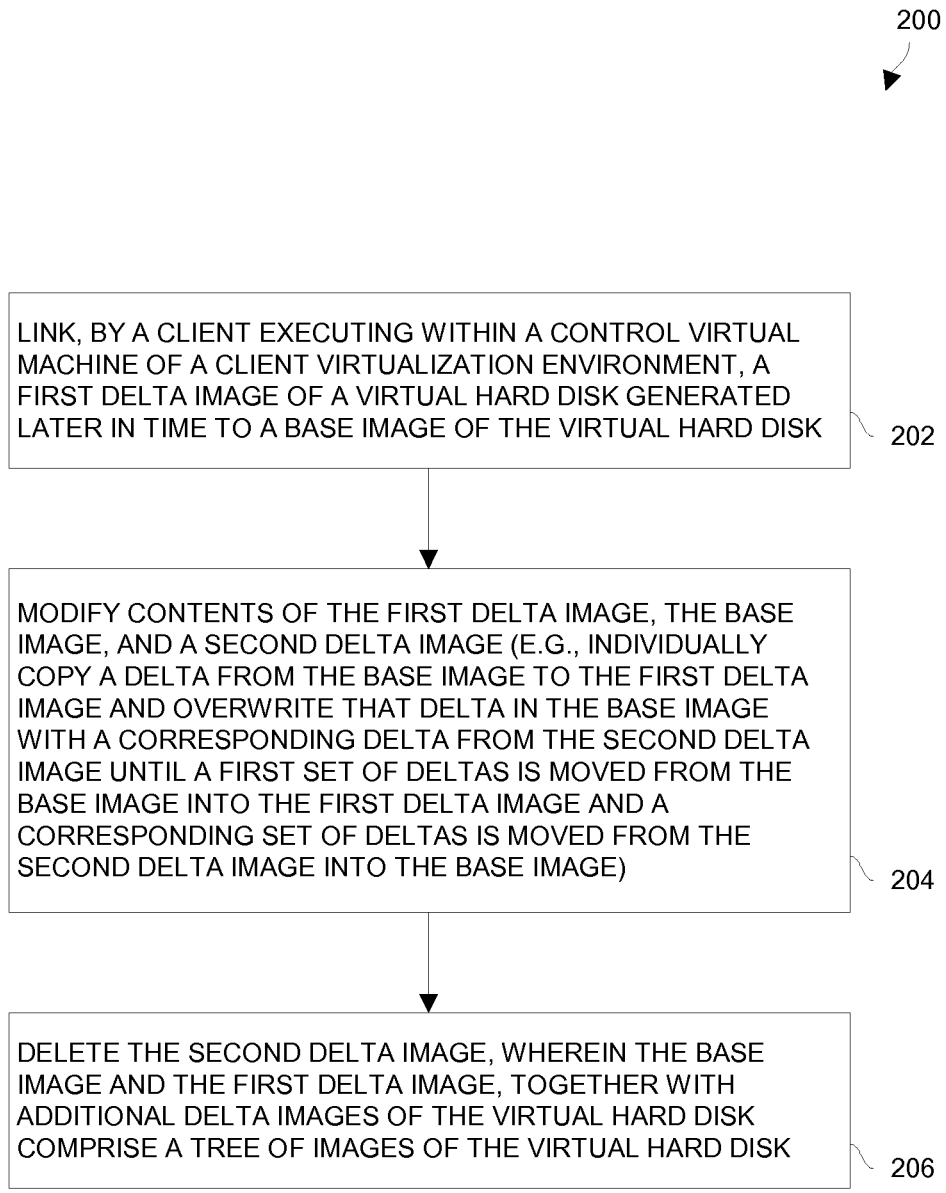
FIG. 13 is a flowchart of a procedure which is performed by the computing system of FIG. 1.

FIG. 13 shows a flowchart of a procedure 200 which is performed by the computing system 20 to dynamically transform a tree 44 of images 54 while hosting a set of VMs 52. In step 202, a client executing within a control virtual machine of the client virtualization environment 22 links a first delta image of a virtual hard disk generated later in time to a base image of the virtual hard disk. Also see the control program 46 executing within the VM 52(0) in FIG. 2 and the differencing image labeled "A–" in FIG. 4.

In step 204, the client modifies contents of the first delta image, the base image, and a second delta image which is linked to the base image. This operation was described above in connection with FIGS. 4 and 5 (also see the images labeled "A–", "BASE" and "A" in FIG. 4).

In step 206, after the client modifies the contents of the first delta image, the base image, and the second delta image, the client deletes the second delta image. This operation was described above in connection with FIGS. 5 and 6. At this point, it should be understood that the base image and the first delta image, together with additional delta images of the virtual hard disk comprise a tree of images of the virtual hard disk.

As mentioned above, this procedure 200 is capable of being performed while running VMs 52 of the client virtualization environment 22 maintain access to the contents of the first delta image, the base image, and the second delta image. Such dynamic transformation may be performed with no meaningful increase in storage capacity. Additionally, once transformation is complete so that the tree 44 of images 54 has the backward differencing formation, the current data is available for reading with low latency.

As described above, techniques are provided which involve transforming trees 44 of images 54 from forward differencing formations 82(F) to backward differencing formations 82(B) while concurrently providing VMs 52 with access to the VHD chains 44. Such transformation techniques are capable of being performed transparently in the background (e.g., during idle time of the computing system 20) while individual snapshots from within the trees 44 of images 54 may remain attached to running VMs 52. In particular, such techniques are able to preserve the integrity of the data at each snapshot as well as the current data at all times. Furthermore, such techniques maintain the ability of the running VMs 52 to access each snapshot and the current data during transformation. Such techniques are even capable of being applied to complex tree structures having multiple chains of images 54.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the various tree examples shown in FIGS. 3-10 and FIGS. 11-12 were provided by way of example only in order to illustrate particular details of the computing system 20 and the transformation utility 54. Other image configurations are suitable for dynamic transformation as well such as longer trees 44 of images 54, shorter trees 44, trees 44 with sub-chains of different lengths, trees 44 with more than two sub-chains, trees 44 with sub-trees having sub-trees, combinations thereof (i.e., arbitrary trees 44 of images 54), etc.

Additionally, it should be understood that control program 46 may reside within a variety of different locations. For example, in some arrangements, the control program 46 forms part of the hypervisor 42 (see FIG. 2). In other arrangements, the control program 46 belongs to a VM 52 with special privileges (e.g., the control domain VM 52(0)). In yet other arrangements, the control program 46 runs outside the computing system 20 (e.g., in a server) such as in situations in which the data of the tree 44 is completely at rest with no VMs accessing the data. Such modifications and enhancements are intended to belong to various embodiments of the present disclosure.

What is claimed is:

1. In a computing system executing a hypervisor to provide a client virtualization environment, a method of managing a virtual hard disk tree, the method comprising:
    linking, by a client executing within a control virtual machine of the client virtualization environment, a first delta image of a virtual hard disk generated later in time to a base image of the virtual hard disk;
    modifying contents of the first delta image, the base image, and a second delta image which is linked to the base image; and
    after modifying the contents of the first delta image, the base image, and the second delta image, deleting the second delta image; and
    wherein the base image and the first delta image, together with additional delta images of the virtual hard disk comprise a tree of images of the virtual hard disk.

2. The method of claim 1, wherein the first delta image is a first backward delta image, wherein the second delta image is a first forward delta image, wherein the first delta image is initially empty, and wherein modifying the contents of the first delta image, the base image, and the second delta image includes, for each block in the second delta image indicating a delta relative to the base image:
    backing up a block in the base image corresponding to the respective block in the second delta image by copying the block in the base image to the first delta image;
    overwriting the block in the base image with the delta from the second delta image; and
    deleting the delta from the second delta image,
    wherein the method further comprises (i) deleting the second delta image from the virtual hard disk tree once all deltas have been deleted from the second delta image and (ii) adjusting a link of a second forward delta image of the virtual hard disk tree to point to the base image.

3. The method of claim 2, further comprising:
    linking a second backward delta image of the virtual hard disk to the base image, wherein the second backward delta image is initially empty;
    for each block in the second forward delta image indicating a delta relative to the base image:
        backing up a block in the base image corresponding to the respective block in the second forward delta image by copying the block in the base image to the second backward delta image;
        overwriting the block in the base image with the delta from the second forward delta image; and
        deleting the delta from the second forward delta image.

4. The method of claim 3, further comprising (i) deleting the second forward delta image from the virtual hard disk tree once all deltas have been deleted from the second forward delta image, (ii) adjusting a link of a third forward delta image of the virtual hard disk tree to point to the base image, and (iii) linking the first backward delta image to the second backward delta image.

5. A method as in claim 1, further comprising:
    providing a set of virtual machines of the client virtualization environment with access to the contents of the first delta image, the base image, and the second delta image while modifying the contents of the first delta image, the base image, and the second delta image.

6. A method as in claim 5 wherein modifying the contents of the first delta image, the base image, and the second delta image includes:
    shifting deltas among the first delta image, the base image, and the second delta image.

7. A method as in claim 6 wherein shifting deltas among the first delta image, the base image, and the second delta image includes:
    moving, by the client, a first set of deltas from the base image into the first delta image and a corresponding set of deltas from the second delta image into the base image.

8. A method as in claim 7 wherein moving, by the client, the first set of deltas from the base image into the first delta image and the corresponding set of deltas from the second delta image into the base image includes:
    individually copying a delta from the base image to the first delta image and overwriting that delta in the base image with a corresponding delta from the second delta image until the first set of deltas is moved from the base image into the first delta image and the corresponding set of deltas is moved from the second delta image into the base image.

9. A method as in claim 1, further comprising:
    replacing a first snapshot pointer which points to the base image with a second snapshot pointer which points to the first delta image to maintain access to data of the base image.

10. A method as in claim 9 wherein modifying contents of the first delta image, the base image, and the second delta image includes:
    after the first delta image is linked to the base image, populating the first delta image with deltas from the base image while providing a set of virtual machines with access to the tree of images.

11. A method as in claim 10 wherein modifying contents of the first delta image, the base image, and the second delta image further includes:
    populating the base image with deltas from the second delta image which is linked to the base image.

12. A method as in claim 11 wherein populating the first delta image with deltas from the base image includes:
    for each delta of the second delta image, copying a corresponding block from the base image to the first delta image, the blocks copied from the base image to the first delta image containing data which is older than that of the deltas of the second delta image.

13. A method as in claim 11 wherein populating the base image with deltas from the second delta image includes:
    for each delta of the second delta image, replacing a corresponding block of the base image with that delta, the blocks being replaced containing data which is older than that of the deltas from the second delta image.

14. A method as in claim 11, further comprising:
    after populating the base image with the deltas from the second delta image, discontinuing access to the second delta image while continuing to provide the set of virtual machines with access to the tree of images, and
    subsequently removing the second delta image from the tree of images.

15. A method as in claim 14 wherein discontinuing access to the second delta image while continuing to provide the set of virtual machines with access to the tree of images includes:
   replacing a third snapshot pointer which points to the second delta image with a fourth snapshot pointer which points to the base image to maintain access to data of the second delta image, and
   circumventing the second delta image by creating a link from another delta image to the base image.

16. A method as in claim 1, further comprising:
   traversing at least a portion of the tree of images in a forward in time direction to read data on behalf of a first virtual machine of the client virtualization environment and traversing at least a portion of the tree of images in a backward in time direction to read data on behalf of a second virtual machine of the client virtualization environment.

17. A method as in claim 1 wherein the tree of images includes multiple sub-chains of images which branch from a common image; and wherein the method further comprises:
   traversing at least a portion of a first sub-chain of the tree of images to read data on behalf of a first virtual machine of the client virtualization environment and traversing at least a portion of a second sub-chain of the tree of images to read data on behalf of a second virtual machine of the client virtualization environment.

18. A computing system for managing a virtual hard disk tree, the computing system comprising:
   physical memory which stores a hypervisor and a control program; and
   a physical processor coupled to the physical memory, the physical processor executing the hypervisor to provide a client virtualization environment;
   wherein the control program, when executing within a control virtual machine of the client virtualization environment, is constructed and arranged to:
      link a first delta image of a virtual hard disk generated later in time to a base image of the virtual hard disk,
      modify contents of the first delta image, the base image, and a second delta image which is linked to the base image, and
      after modifying the contents of the first delta image, the base image, and the second delta image, delete the second delta image, and
   wherein the base image and the first delta image, together with additional delta images of the virtual hard disk comprise a tree of images of the virtual hard disk.

19. A computing system as in claim 18 wherein a set of virtual machines of the client virtualization environment is constructed and arranged to access the contents of the first delta image, the base image, and the second delta image while the control program modifies the contents of the first delta image, the base image, and the second delta image.

20. A computing system as in claim 19 wherein the control program is further constructed and arranged to:
   replace a first snapshot pointer which points to the base image with a second snapshot pointer which points to the first delta image to maintain access to data of the base image.

21. A computing system as in claim 20 wherein the control program, when modifying contents of the first delta image, the base image, and the second delta image, is constructed and arranged to:
   individually copy a delta from the base image to the first delta image and overwriting that delta in the base image with a corresponding delta from the second delta image until a first set of deltas is moved from the base image into the first delta image and a corresponding set of deltas is moved from the second delta image into the base image.

22. A computing system as in claim 21 wherein at least a portion of the tree of images is traversed in a forward in time direction to read data on behalf of a first virtual machine of the client virtualization environment and at least a portion of the tree of images is traversed in a backward in time direction to read data on behalf of a second virtual machine of the client virtualization environment.

23. A computing system as in claim 21 wherein the tree of images includes multiple sub-chains of images which branch from a common image.

* * * * *